Figure 1:
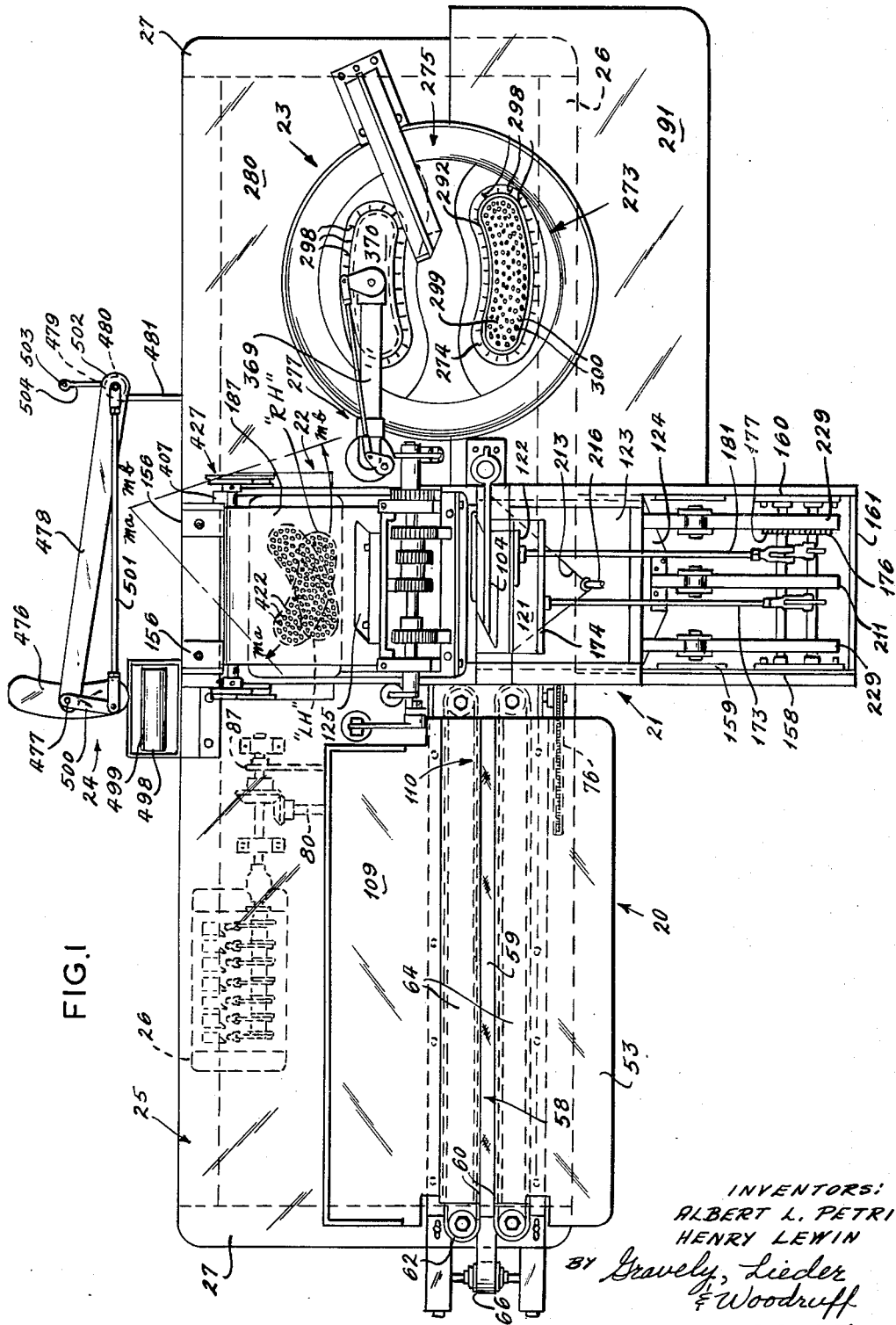

INVENTORS:
ALBERT L. PETRI
HENRY LEWIN
BY Gravely, Lieder
& Woodruff
ATTORNEYS.

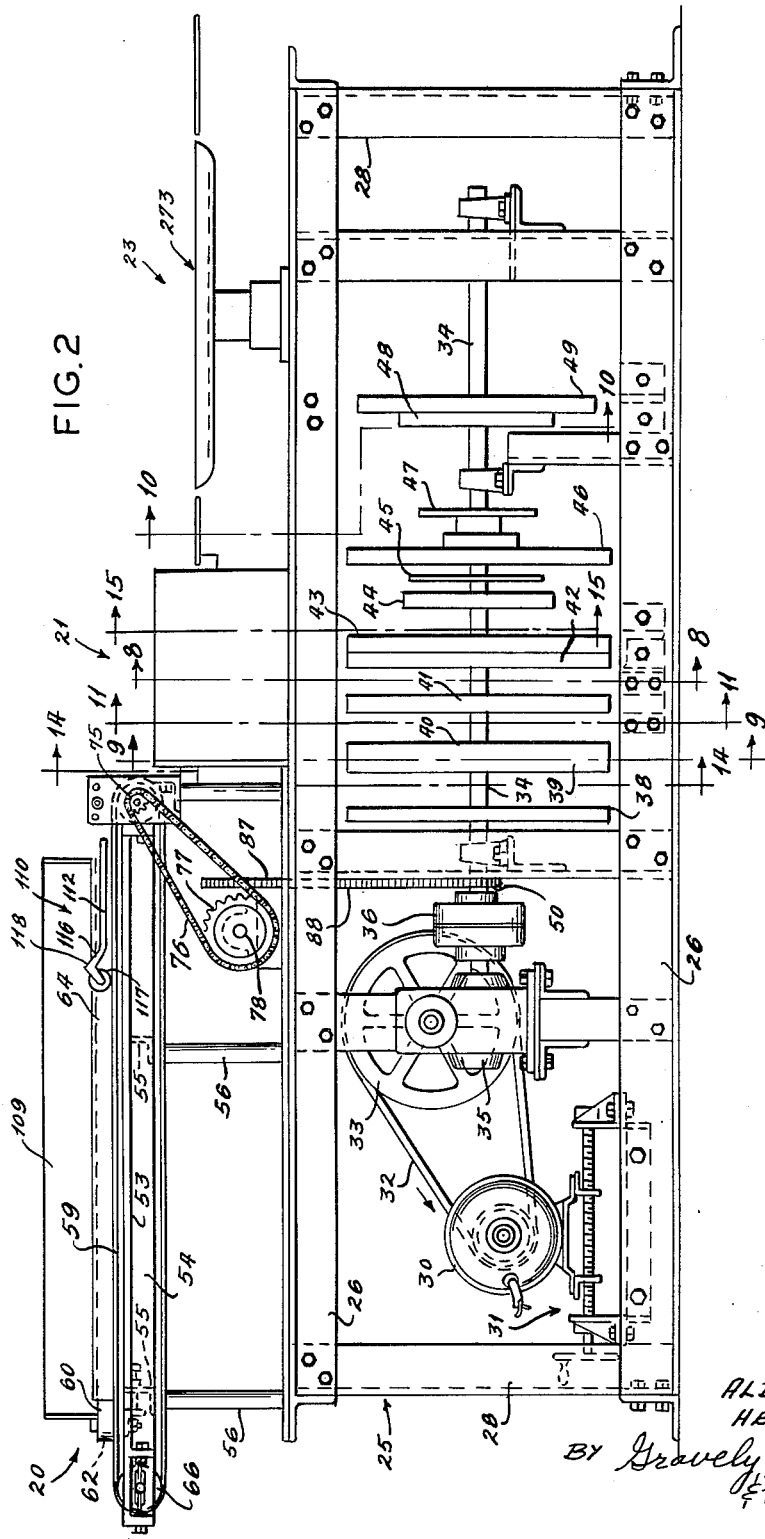

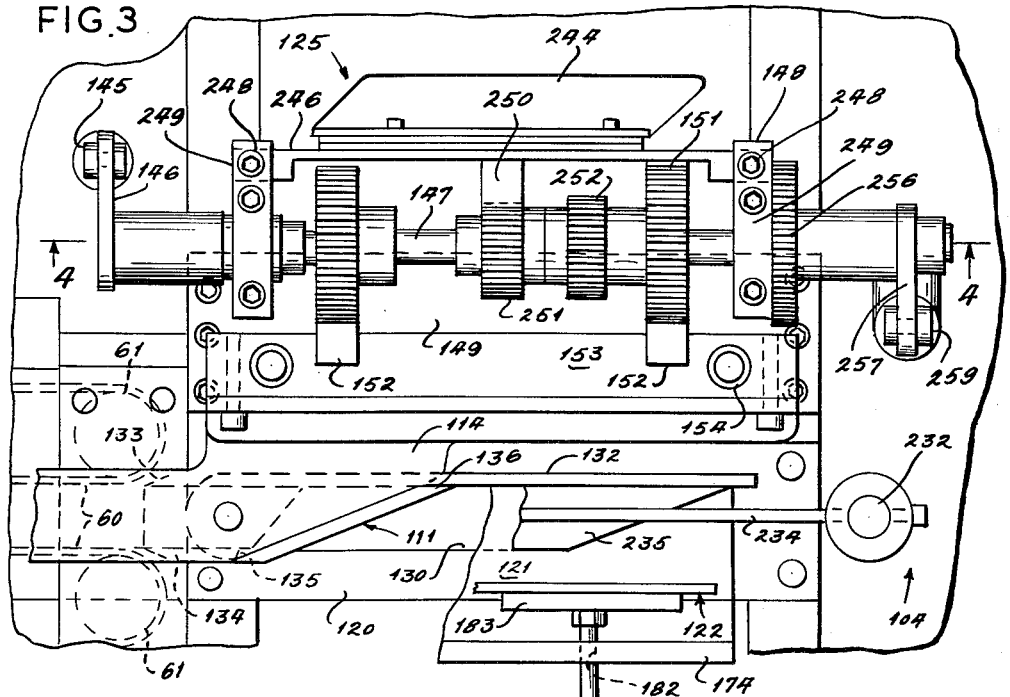

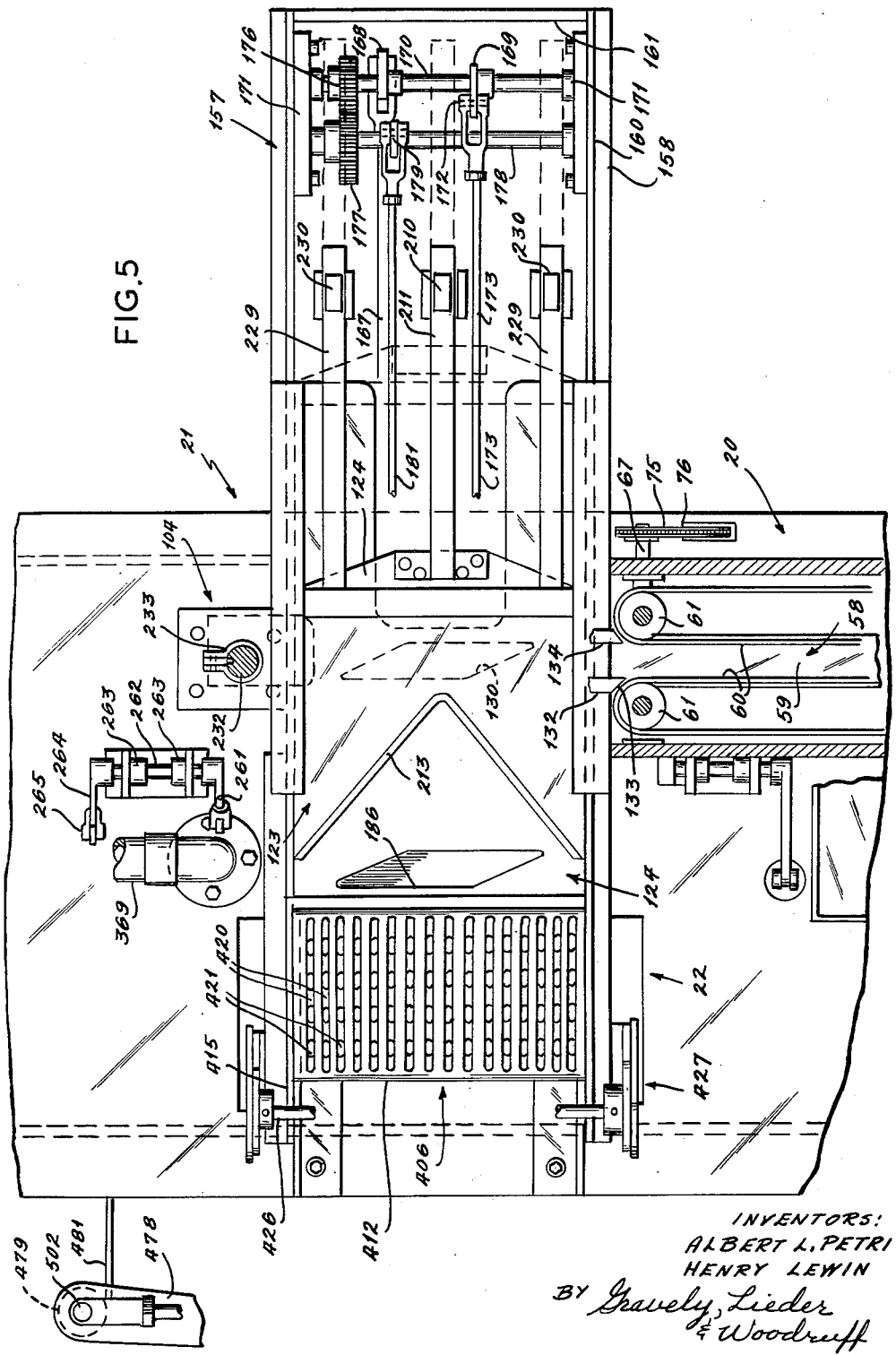

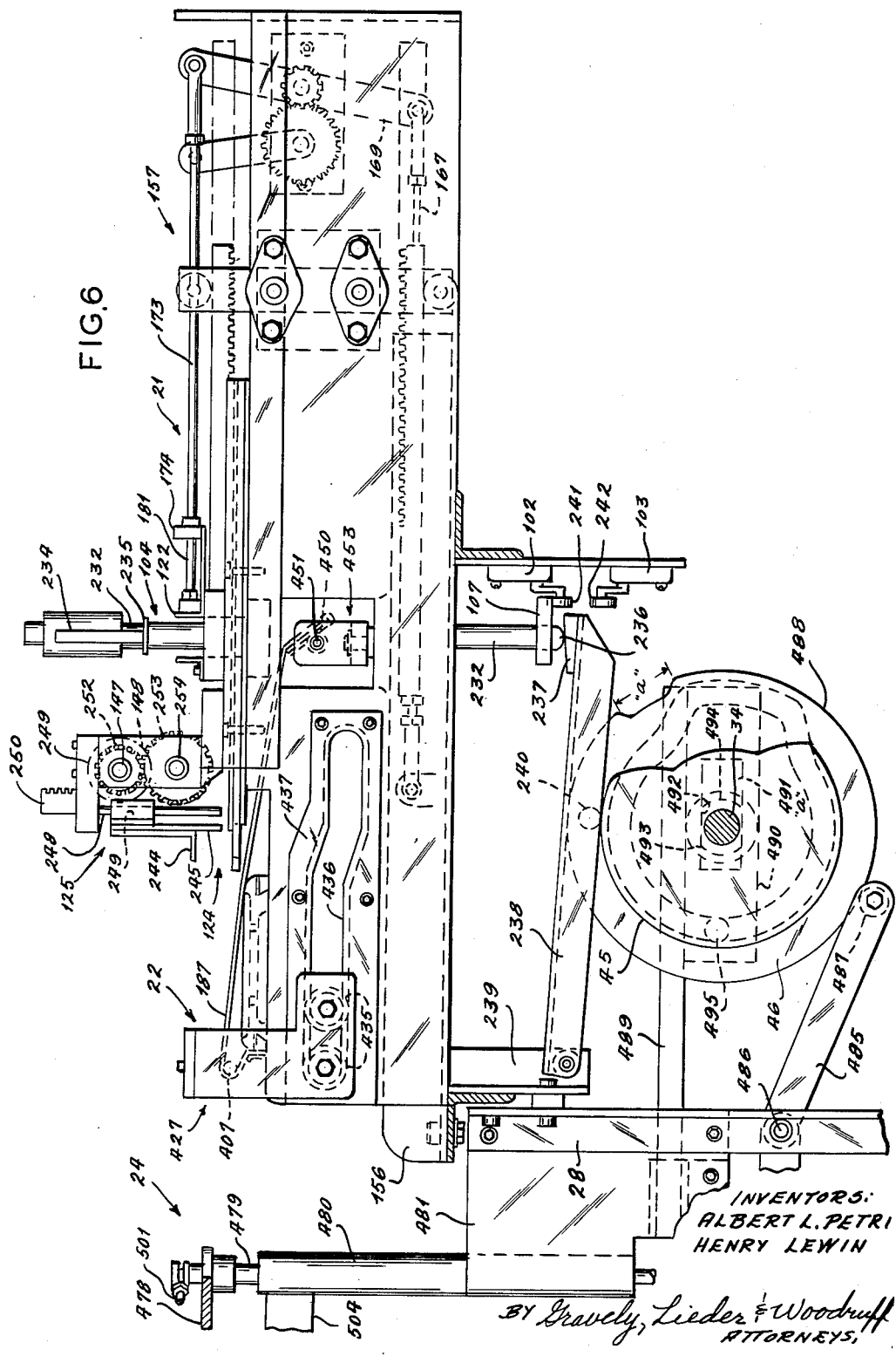

Aug. 10, 1965  A. L. PETRI ETAL  3,199,514
CIGAR MAKING MACHINE
Original Filed March 13, 1959  13 Sheets-Sheet 6
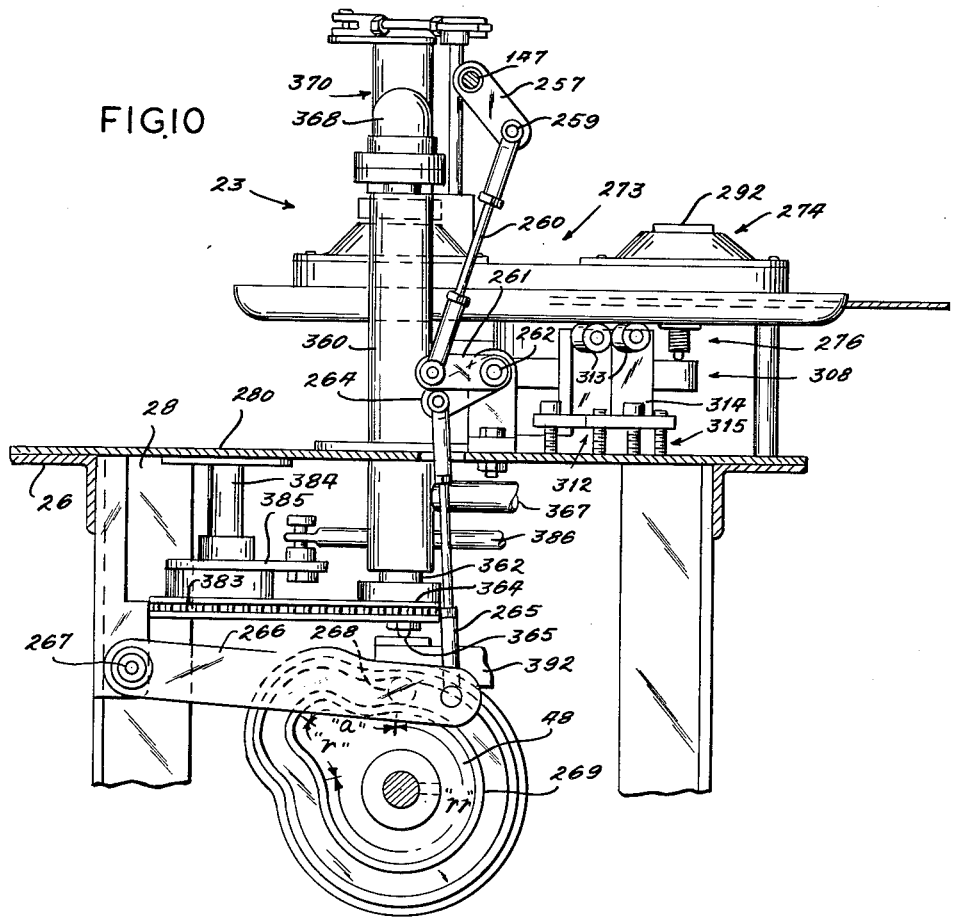
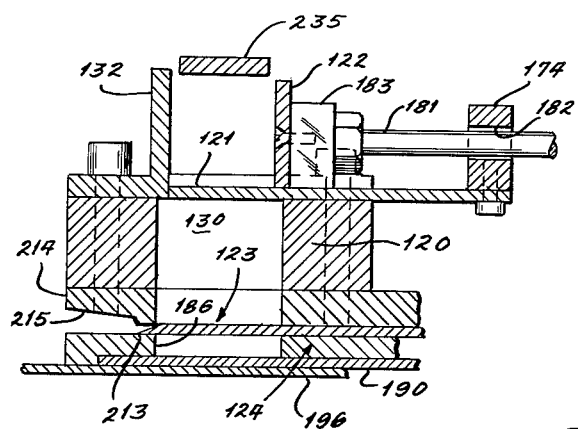
INVENTORS:
ALBERT L. PETRI
HENRY LEWIN
BY Gravely, Lieder & Woodruff
ATTORNEYS.

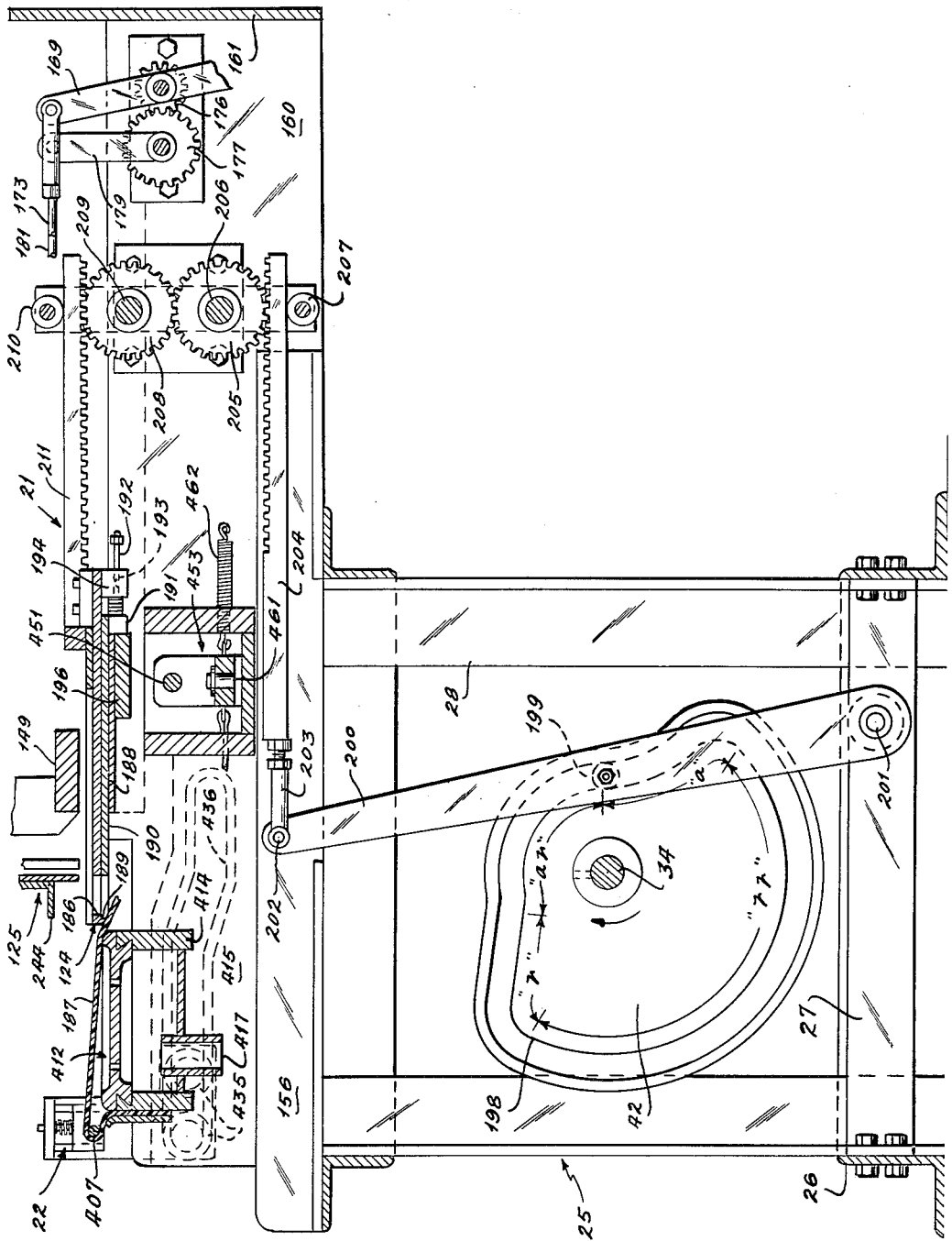

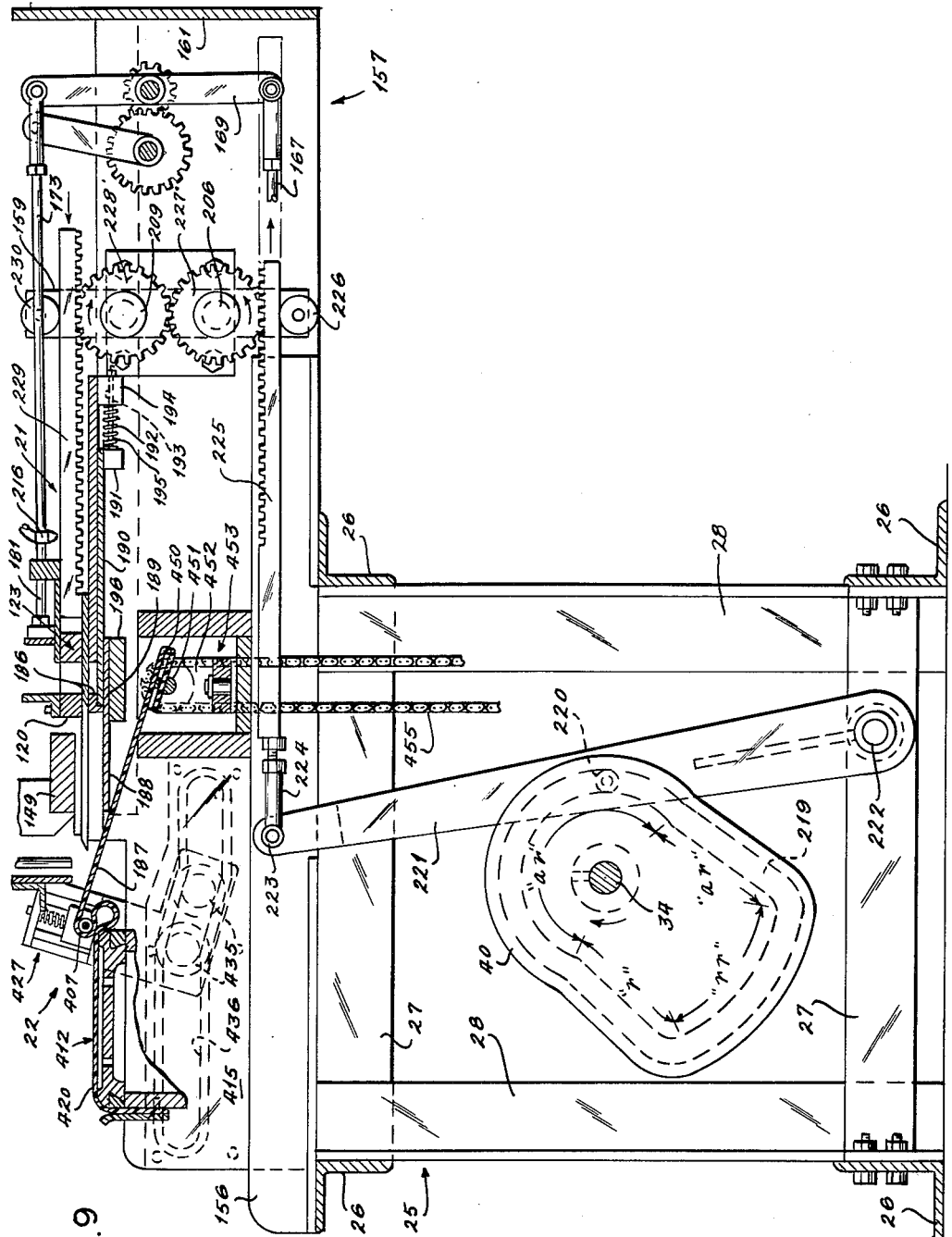

Aug. 10, 1965 A. L. PETRI ETAL 3,199,514
CIGAR MAKING MACHINE
Original Filed March 13, 1959 13 Sheets-Sheet 9
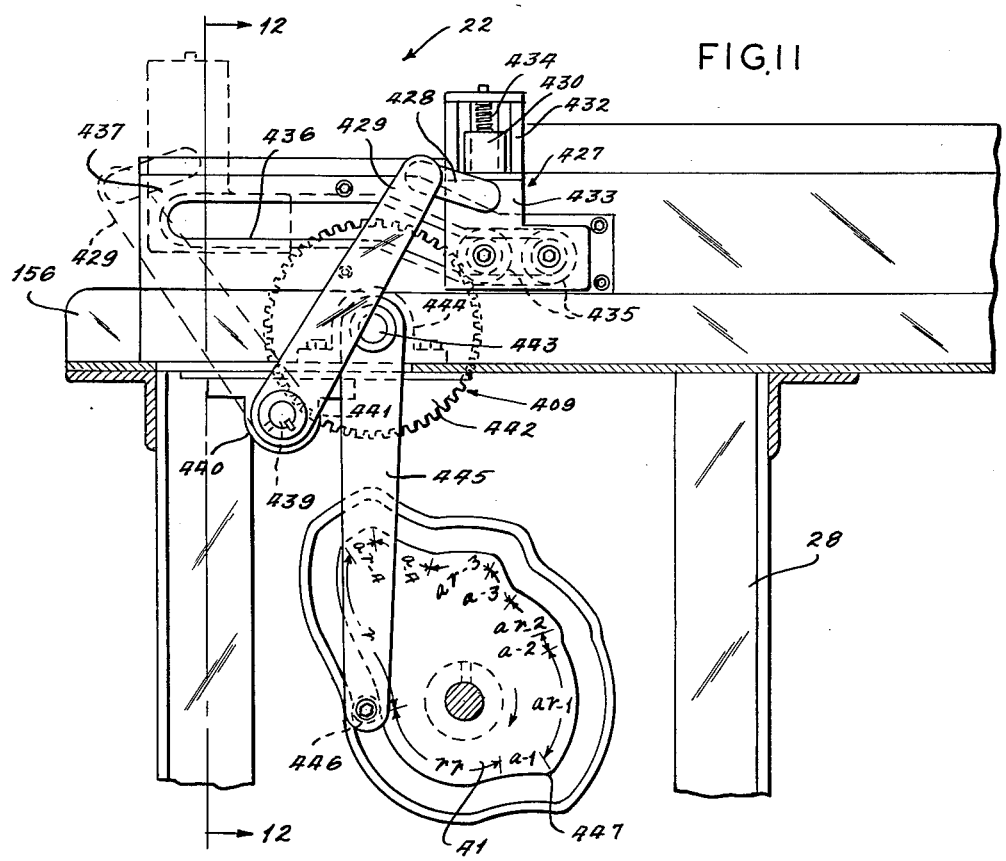
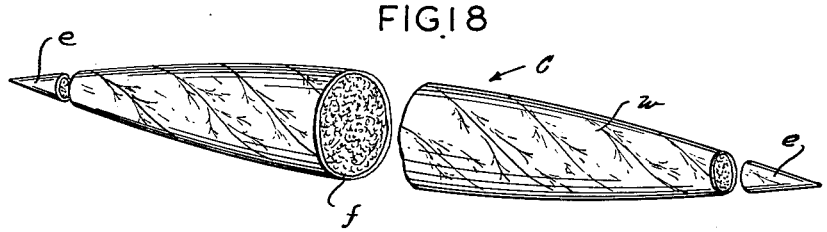
INVENTORS:
ALBERT L. PETRI
HENRY LEWIN
BY Gravely, Lieder
& Woodruff
ATTORNEYS.

Aug. 10, 1965     A. L. PETRI ETAL     3,199,514
CIGAR MAKING MACHINE
Original Filed March 13, 1959     13 Sheets-Sheet 10
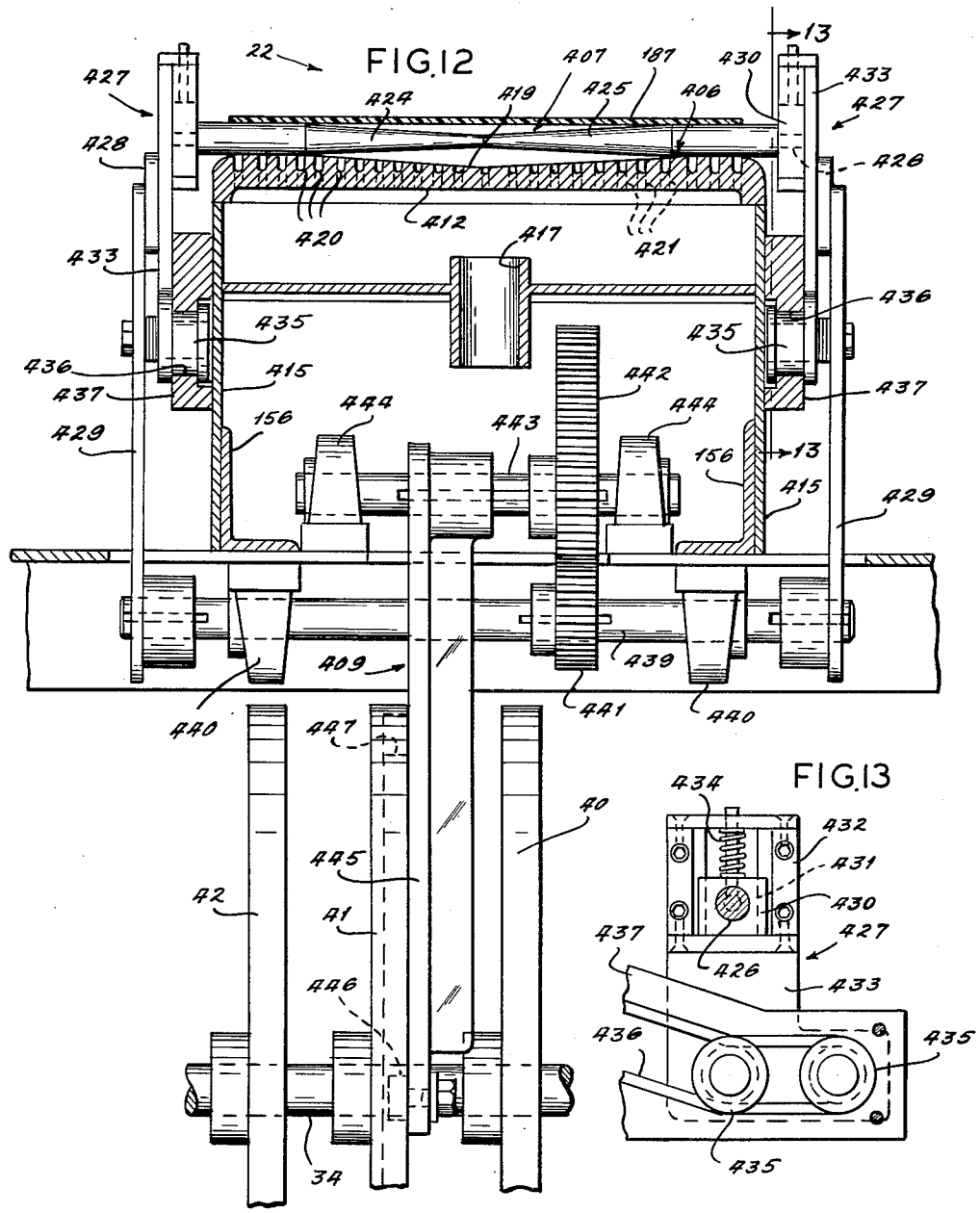
INVENTORS:
ALBERT L. PETRI
HENRY LEWIN
BY Gravely, Lieder
& Woodruff
ATTORNEYS.

Aug. 10, 1965　　　A. L. PETRI ETAL　　　3,199,514
CIGAR MAKING MACHINE
Original Filed March 13, 1959　　　13 Sheets-Sheet 11
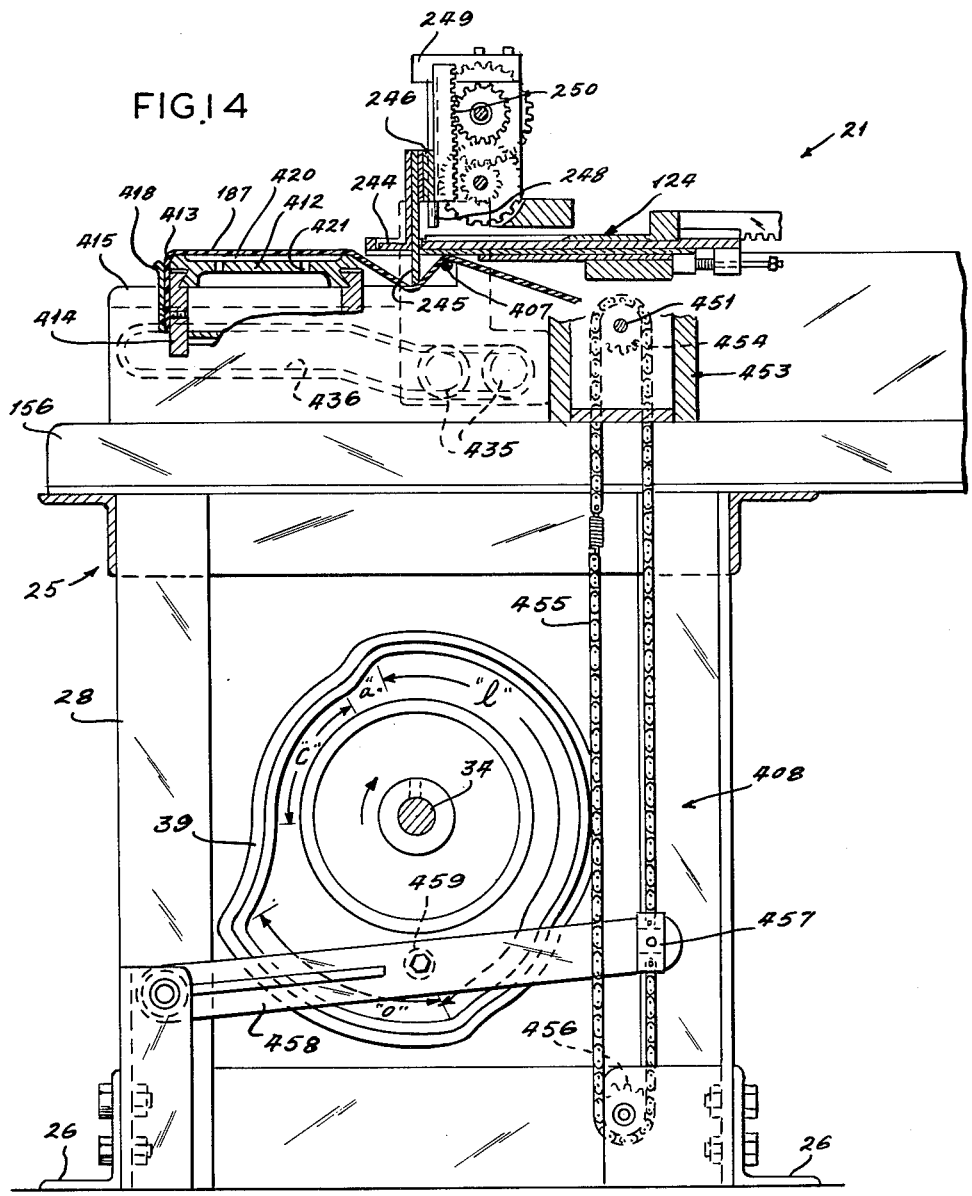
INVENTORS:
ALBERT L. PETRI
HENRY LEWIN
BY Gravely, Liedes
& Woodruff
ATTORNEYS.

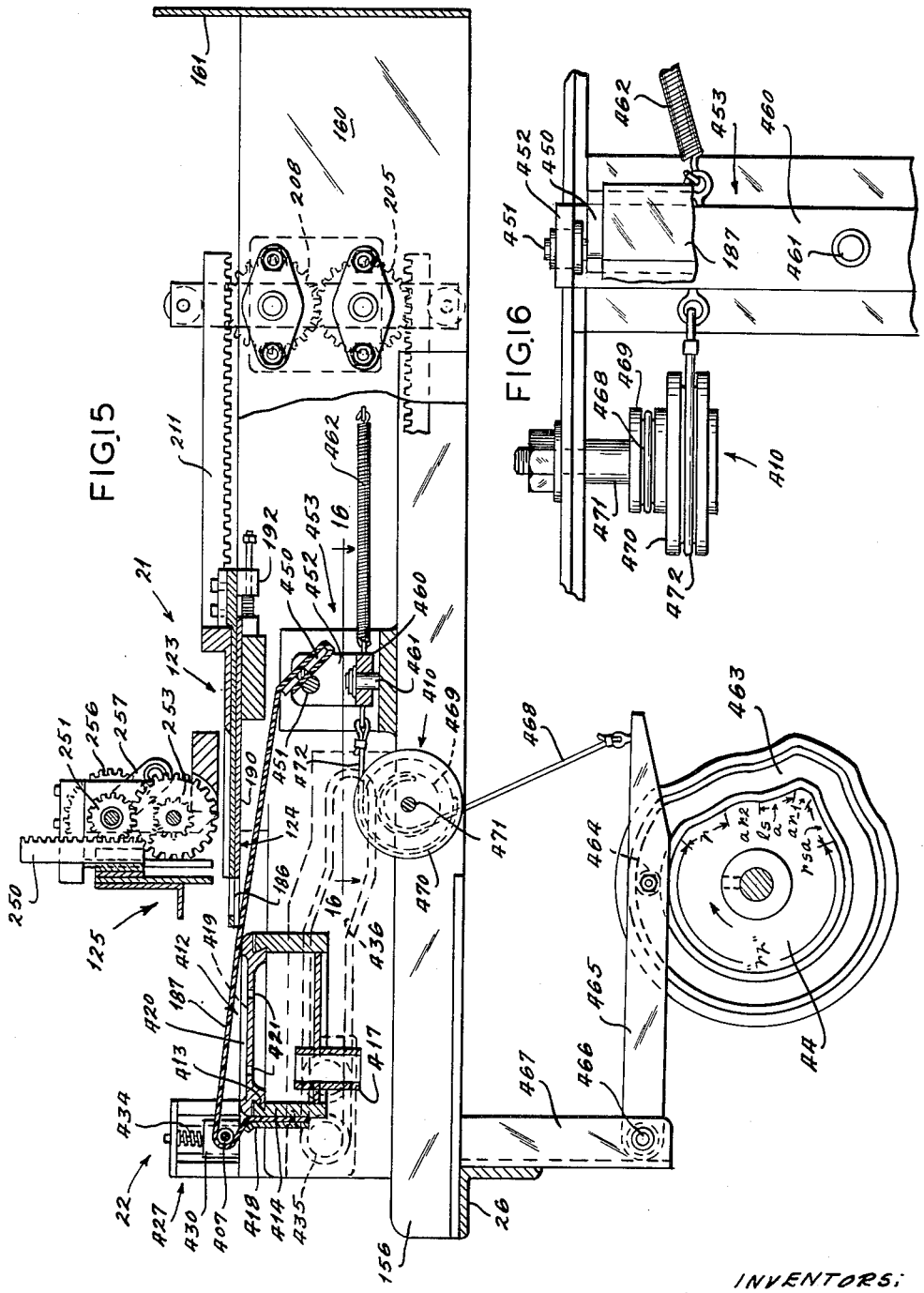

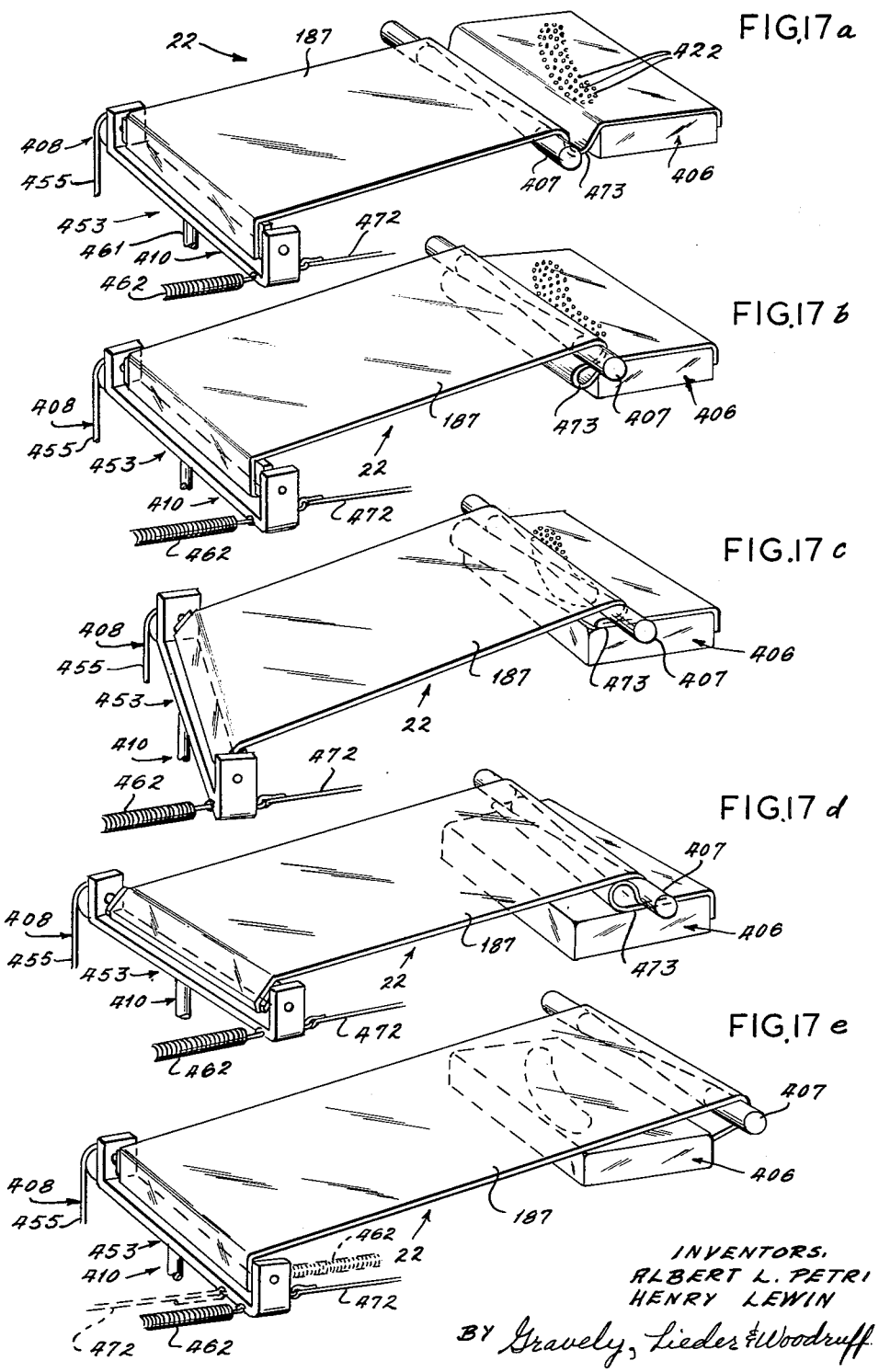

United States Patent Office 3,199,514
Patented Aug. 10, 1965

3,199,514
CIGAR MAKING MACHINE
Albert Louis Petri, Atherton, Calif., and Henry Lewin, Clarksville, Tenn., assignors, by mesne assignments, to Petri Cigar Company, Clarksville, Tenn., a corporation of Tennessee
Original application Mar. 13, 1959, Ser. No. 799,137, now Patent No. 3,105,497, dated Oct. 1, 1963. Divided and this application Nov. 26, 1962, Ser. No. 239,888
9 Claims. (Cl. 131—33)

This is a divisional application of our co-pending application Serial No. 799,137 filed Mar 13, 1959 for Cigar Making Machine issued October 1, 1963 as Patent No. 3,105,497.

This invention relates generally to cigar making machines, and more particularly to improvements in automatic mechanisms for manufacturing uniform cigars.

Heretofore many mechanisms and devices have been proposed for mechanically producing cigars having a uniform length and desired shape, using filler, binder and wrapper and applying adhesive on an end portion of the binder and wrapper. However, none of these devices has been entirely satisfactory, particularly for making Cheroot or stogie type cigars. Although the present cigar making machine is adapted to form various shaped cigars, it will be described hereinafter for purposes of disclosure with reference to the manufacture of stogie cigars as well as cylindrical cigars of indeterminate length to be cut into shorter cigars.

The typical stogie cigar has a substantially frusto-conical shape, and two of these cigars are produced by rolling a single cigar having an enlarged central portion and long tapering ends, clipping the ends and then cutting the cigar through the center. In hand-rolled stogie cigars, a bunch or filler is formed of long strands of tobacco and the bunch is then wrapped with a wrapper of fine grade tobacco, the wrapper being provided with suitable paste or adhesive on one or both sides or along the edges thereof, the wrapper going twice around the filler to eliminate the necessity for a conventional binder. Hand-rolled cigars are formed of tobacco having a residual or natural moisture content of substantially 40% to 45%. Inasmuch as the aroma and taste of a cigar is adversely affected by decreases in the moisture content, which cannot be artificially corrected after the cigar is made, it is important that a cigar making machine be adapted to handle such moist tobacco for long periods of time without becoming gummed up and inoperative and without compressing the tobacco forming the filler into a solid mass or plug. Heretofore, mechanisms proposed for rolling cigars have not been able to meet the requirement of using tobacco with a moisture content up to 45%.

Cigar machines heretofore have also had the disadvantages of requiring straightening and other pretreatment of tobacco after fermentation and prior to machine rolling, of being unable to rapidly produce uniform cigars using fillers or bunches formed of different lengths of tobacco, of requiring a great deal of personnel in the operation, inspection and maintenance thereof, and of being expensive to manufacture and maintain and relatively large and heavy.

The principal object of the present invention is to provide an improved cigar making machine which overcomes the disadvantages known heretofore and is adapted to rapidly manufacture uniform cigars having a high moisture content.

Another object is to provide a cigar making machine having a positive bunch transfer to a rolling table, and means for controlling the rolling operation to provide shaped cigars.

Another object is to provide a cigar making machine adapted to form uniform cigars of different lengths and which is adapted to operate efficiently for long periods of time with tobacco having a high moisture content without requiring down time for cleaning, repair or the like.

Another object is to provide a cigar making machine, the operation of the several mechanisms thereof being in timed relationship and indexed in operation so that the machine may operate at variable speeds and produce uniform cigars at all production speeds.

A still further object is to provide improved mechanisms for transferring bunches or fillers, providing a positive and indexed bunch discharge to a rolling apron pocket, and means controlling adjustment in the tension and motion of the apron in timed relation with the forming roller during the cigar rolling operation.

These and still other objects and advantages will become apparent hereinafter.

Briefly, the present cigar making machine comprises integrated mechanisms forming a bunch of tobacco and transferring it to a rolling table apron in an indexed position, means for forming and delivering a wrapper to an indexed position on the apron, and means for rolling the bunch in the wrapper in a controlled motion to produce a cigar of predetermined shape. The invention further consists in the parts and in the arrangements and combinations of parts hereinafter described and claimed.

In the accompanying drawings which form a part of this specification and in which like numerals refer to like parts wherever they occur:

FIG. 1 is a top plan view of a cigar making machine embodying the present invention, FIG. 2 is a vertical elevational view, partly in section, showing the principal drive means for the machine, FIG. 3 is a plan view of the vertical knife, compactor and knock-out devices, FIG. 4 is a vertical cross-sectional view taken along line 4—4 of FIG. 3, FIG. 5 is a plan view, partly in section, of the cross feed, bunch forming and rolling table mechanisms, FIG. 6 is a vertical elevational view showing the vertical compactor and the adhesive means and cams therefor and also showing the knock-out device and rolling table mechanism, FIG. 7 is a vertical cross-sectional view of the reservoir for the bunch forming mechanism, FIG. 8 is a vertical cross-sectional view of the transfer box and cam therefor as taken along line 8—8 of FIG. 2, FIG. 9 is a vertical cross-sectional view of the horizontal knife and cam therefor as taken along line 9—9 of FIG. 2, FIG. 10 is a vertical view of the control means including the cam for the knock-out device shown in FIG. 3, taken along line 10—10 of FIG. 2, FIG. 11 is a side elevational view of the rolling table mechanism and the cam for the forming roller as taken along line 11—11 of FIG. 2, FIG. 12 is an elevational view taken along line 12—12 of FIG. 11 and showing the forming roller in the phantom line position thereof, FIG. 13 is a greatly enlarged view showing the carriage assembly for the forming roller as taken along line 13—13 of FIG. 12, FIG. 14 is a vertical elevational view, partly in section, of the apron tightening means and cam therefor as taken along line 14—14 of FIG. 12, FIG. 15 is a vertical cross-sectional view of the rolling table and bunch forming mechanisms and the cam for the apron control means as taken along line 15—15 of FIG. 2, FIG. 16 is a fragmentary cross-sectional view taken along line 16—16 of FIG. 15, FIGS. 17a–e are diagrammatic perspective views showing a series of steps in the rolling operation of the rolling table mechanism, and FIG. 18 is an exploded perspective view showing a typical stogie cigar formed in the present machine with the end portions clipped and being severed in the center to form two cigars.

As shown in FIG. 18, a typical stogie cigar C formed by the present machine is shown for purposes of illustration, but the machine is also adapted to form cigars of other shapes. The cigar C has a central filler $f$ rolled in a wrapper $w$ and the cigar has end portions $e$ trimmed therefrom when the cigar is taken from the present machine by suitable mechanism. The cigar C is also divided at its center to form two frusto-conical cigars from the single cigar made by the machine.

Referring now to the other drawings in detail, it will be seen that the present cigar making machine comprises a cross feed mechanism 20, a bunch forming and transfer mechanism 21, a rolling table mechanism 22, a wrapper forming and transfer mechanism 23 and an adhesive depositing mechanism 24. These mechanisms and the drive and control means therefor are supported on a main frame 25 having longitudinal upper and lower members 26, cross members 27 and vertical members 28. As shown in FIG. 1, the cross feed mechanism 20 is mounted on the left-hand portion of the frame 25, the wrapper forming and transfer mechanism 23 is mounted on the right-hand portion thereof, the bunch forming and transfer mechanism 21 and the rolling table mechanism 22 are mounted on the center portion of the frame 25 in transverse alignment, and the adhesive depositing mechanism 24 is also supported on the central portion of the frame.

Referring to FIG. 2, the machine is powered from a variable speed motor 30 or the like mounted on the main frame 25 and being horizontally adjustable by means 31 for regulating the tension of drive belt 32 which extends around wheel 33 for driving a main shaft 34 through a suitable reducer unit 35 and an overload clutch 36. The main shaft 34 is journaled in bearings in the main frame 25 and carries a plurality of cams 38–49 and sprocket wheel 50, a single revolution of the main shaft 34 effecting a complete cycle of the operation of the machine to produce one cigar. As will be described more fully hereinafter, the cams 38–49 comprise a portion of the drive and control means for the machine and include a vertical knife cam 38, an apron tightening cam 39, a horizontal knife cam 40, a forming roller cam 41, a transfer box cam 42, a slide plate and alignment block cam 43, a swivel bar control cam 44, a compactor cam 45, an adhesive control cam 46, a pick-up head height control cam 47, a knock-out device cam 48 and a pick-up head rotating cam 49.

*Cross feed mechanism.*—The cross feed mechanism 20, herein briefly described with particular reference to FIGS. 1, 2, 3 and 5, is more fully set out in said copending application Serial No. 799,137. The cross feed mechanism 20 is mounted on a top plate 53 having side and cross members 54 and 55 secured to the underside thereof and spaced above the main frame 25 by vertical members 56. A longitudinal channel 58 is formed in which a horizontal feed belt 59 and spaced vertical feed belts 60 move to define a feed conveyor for carrying a layer of tobacco strips (not shown) to the bunch forming mechanism 21. The forward end of the side belts 60 are mounted on drive pulleys or rollers 61 and the rearward ends extend around idler pulleys or rollers 62. Cover plates 64 are also provided to cover the top and return side of the belts 60. The horizontal or bottom belt 59 has side margins, which are positioned under the lower margins of the side belts 60, and the rearward end of the belt 59 extends around an idler roller 66. The drive roller (not shown) for the belt 59 is mounted on a stub shaft 67 and the drive rollers 61 are driven through suitable gears from the shaft 67. Mounted on one end of the shaft 67 is a sprocket wheel 75, which is driven by a sprocket chain 76 extending around sprocket 77 on one end of a shaft 78 journaled on the main frame 25. Another stub shaft 80 is journaled on frame 25 and is axially aligned with shaft 78 and these shafts are provided with a suitable magnetic clutch. The other end of the shaft 80 is connected through gears to a shaft 85 having a sprocket wheel 87 driven by a chain 88 from the sprocket wheel 50 on the main drive shaft 34. The cross-feed mechanism 20 is activated for a preselected time interval when switch means to the magnetic clutch are closed, the switch means including limit switches 102 and 103, FIG. 6, adapted to be operated by a compactor device 104 so that the cross feed mechanism 20 operates only when additional tobacco is required by the bunch forming mechanism 21. The compactor device 104 of the mechanism 21 serves to press tobacco prior to the machine operation in which the cross feed mechanism is actuated.

The cross feed mechanism 20 includes a shelf 109 on which strips of filler tobacco are placed and from which these strips may be laid in the feed conveyor channel 58 by an operator to form a layer of tobacco which is fed intermittently forwardly by the engagement of the clutch to deliver a predetermined length of filler material to the bunch forming mechanism 21.

The cross feed mechanism 20 also includes a vertically reciprocable pressure member 110, which is associated with a vertical cutter knife 111 of the bunch forming mechanism 21 and is actuated simultaneously therewith by the cam 38. The pressure member 110 comprises a spring loaded shoe 112 having an upwardly turned rearward lip 116 to facilitate the feeding of tobacco beneath the shoe. A roller 117 carried on arm 118 pivotally mounted on the frame is positioned in the cross feed channel rearwardly of the pressure member, FIG. 2. The roller 117 rides on the tobacco in the channel and presses the tobacco and assists in directing it under the shoe 112.

In operation, the pressure member 110 and the knife 111 are in raised position during cross feed actuation by the cam 38, and when the cross feed mechanism is again at rest the cam 38 moves the shoe 112 into tobacco pressing contact in the cross feed channel 58 and also moves the knife 111 into tobacco severing position.

*Bunch forming and transfer mechanism.*—The bunch forming mechanism 21 is positioned to the right of the cross feed mechanism 20 in FIGS. 1 and 2 of the drawings and receives tobacco therefrom as required. The bunch forming mechanism comprises the vertical knife 111, a reservoir block 120, the vertical compactor 104, a slide plate 121, an alignment block 122, a horizontal knife 123, a transfer box 124 and a knock-out device 125.

Referring to FIGS. 1, 3 and 5, the knife 111 has a cutting edge 127 in a predetermined angular position relative to the longitudinal direction of movement of the layer of tobacco in the cross feed channel so that the end edges of tobacco layer cut by the knives are angular to form a parallelogram-shaped length of tobacco substantially complementary to the shape of the reservoir opening 130 in the reservoir block 120, FIG. 5. An abutment and guide plate 132 is secured to the reservoir block 120 in substantially conterminous relation with the side belt 60 and in vertical alignment with the forward wall of opening 130, the rearward margin 133 being cut angularly to fit immediately adjacent to the drive roller 61 to receive the belt 60 therebetween, FIGS. 3 and 5. Another guide plate 134 is spaced from plate 132 to define an extension of the feed channel, the longitudinally forward end 135 of the plate 134 being behind the position of vertical knife 111. The knife 111 has a side margin 136 in surface contact with the abutment plate 132. The control means for actuating the knife 111 and pressure member 110 in the cross feed channel 58 includes the cam 38 and lever means having its upper end 145 pivotally connected to one end of a link 146, which is secured on one end of a shaft 147 journaled in spaced upstanding bearing blocks 148 of a base member 149 rigidly secured to a bunch forming mechanism frame 150 supported on the main frame 25, FIGS. 3 and 4. The shaft 147 has spaced spur gears 151 thereon, which are meshed with toothed vertical racks 152 secured to a guide member 153 vertically slidable on spaced vertical rods 154 secured to the base member 149. The carrier member 114 for the knife 111 and pressure member 110 is rigidly secured to the guide member 153.

Referring now to FIGS. 1, 5, 6, 8 and 9, it will be seen that frame members 156 extend transversely of the main frame 25 and rearwardly therefrom to form a support for a cantilever housing 157 in which control means for the bunch forming mechanism 21 is housed. The housing 157 also includes upper horizontal frame members 158, vertical members 159, and side and end plates 160 and 161.

The reservoir block 120 is mounted above the housing 157 and forwardly thereof over the main frame 25. The slide plate 121 is slidably positioned on top of the reservoir block 120 and the alignment block 122 slides on the slide plate 121. The slide plate 121 is movable between an actuated position in which the reservoir opening 130 is uncovered to receive bunch lengths of tobacco from the cross feed mechanism 20 and a retracted position in which the plate 121 abuts the abutment and guide plate 132 to cover the opening 130 so that the slide plate 121 supports tobacco thereon when the cross feed mechanism is actuated and while it is being cut by the vertical knife 111. The alignment block 122 cooperates with the slide plate 121 and moves opposite thereto between an actuated position and a retracted position. In actuated position, tobacco on the slide plate is pushed against the alignment plate 132 in vertical alignment with the reservoir opening 130 as the slide plate is actuated to a withdrawn position so that the filler tobacco will be discharged into the opening 130 and form a vertical stack therein. In retracted position, the alignment block 122 moves away from the plate 132 as slide plate moves to retracted or closed position over the reservoir opening 130 so that the cross feed tobacco will pass between the plate 132 and block 122.

The slide plate and alignment block 121 and 122 are controlled by the cam 43 through a drive rod 167 having one end 168 pivotally connected to the lower end of link 169, which is secured intermediate its ends to cross shaft 170 journaled in end bearing members 171 mounted on side plate 160 of the housing 157. The upper end 172 of link 169 is connected to rod 173 and the other end of the rod 173 is secured to a connecting element 174 secured to the rearward edge of the slide plate 121. The shaft 170 also has a spur gear 176 thereon which is meshed with a spur gear 177 on a shaft 178 journaled in the end bearing members 171. One end of a link 179 is secured to the shaft 178 and the upper end 180 of the link 179 is pivoted to a rod 181. The rod 181 extends through an opening or notch 182 in connecting element 174 and has its end secured to a back plate 183 on alignment block 122, FIG. 7.

The transfer box 124 and the horizontal knife 123 are positioned beneath the reservoir block 120 and are movable transversely relative to the main frame 25. The transfer box 124 is spaced below the reservoir block and has an opening 186 similar to the reservoir opening 130, these openings being aligned when the box 124 is retracted. The box is adapted to be actuated to a forward position toward the rolling table mechanism 22 to deposit a tobacco bunch for one cigar in an indexed position on a flexible apron 187 forming a portion of the rolling table mechanism 22. The transfer box 124 is formed of an elongated plate of predetermined thickness and slides on an imperforate plate 188 of bearing material secured to the frame members 158. The lower surface of the box 124 is relieved to form an open ended channel 189 in which a bottom cover 190 is positioned, FIGS. 7-9. Spaced blocks 191 are secured to the bottom of the cover 190 at the rearward end thereof, and rods 192 extend rearwardly from the blocks 191 through openings 193 in blocks 194 secured below the end of the transfer box 124. Springs 195 on the rods normally bias the cover 190 forwardly to a closed position relative to the transfer box opening 186. A stop or abutment member 196 is secured between the frame members 158 in position to be contacted by the cover blocks 191 near the bunch discharge position of the transfer box 124 during the actuation thereof so that the forward movement of the cover 190 will be stopped to open the bottom of the transfer box.

The cam 42 for controlling the movement of the transfer box 124 has a cam surface 198 in which is positioned a follower 199 connected intermediate the ends of lever 200, the lower end 201 of the lever being pivoted to frame member 27 and the upper end 202 being pivotally connected to rod 203, FIG. 8. A toothed rack 204 has one end connected to the rod 203 and the rack is meshed with a spur gear 205 which is positioned intermediate the ends of a shaft 206 and is rotatable relative to the shaft. An idler roller 207 is positioned below the gear 205 to support the rack 204 and maintain it in engagement with gear 205. Another spur gear 208 is freely rotatable on a shaft 209 and is meshed with the gear 205, and another guide or idler roller 210 is spaced above gear 208 to maintain another toothed rack 211 in mesh with the gear 208. The rack 211 is secured to the center of the rear margin of the transfer box 124 and it is apparent that the transfer box is driven by cam 42 through lever 200, rack 204, gears 205 and 208 and rack 211.

The cam 42 is shown in FIG. 8 just entering a rest period in which the transfer box 124 is actuated to its bunch discharging position indexed over the apron 187. The actuated rest portion of the cam 42 is designated ar and is shown by arrows. The actuation portion of the cam surface 198 is designated a, and the retraction portion is designated r. The cam 38 also has a retracted rest portion shown as rr. For purposes of disclosure, all cams will be similarly designated. When the follower 199 moves along the retract portion r of cam 42, lever 200 and rack 204 will move to the right to rotate gear 205 counterclockwise and gear 208 clockwise thereby moving rack 211 to the right also.

The horizontal knife 123 is positioned between the reservoir block 120 and the transfer box 124 and is slidable on each, the knife 123 having a retracted position in which the transfer box 124 is retracted and the opening 186 thereof forms a portion of the reservoir opening 130. The horizontal knife is movable to an actuated forward position in which the tobacco in the vertical stack is severed across the top of the box 124 to form a bunch for making one cigar. It is apparent that the transfer box remains in retracted position until the knife 123 is fully actuated, and the box is then actuated to bunch discharging position and again fully retracted to reservoir position before the knife is retracted. Accordingly, the knife forms a bottom for the reservoir opening 130 during transfer box actuation and retraction to maintain the vertical stack of tobacco thereabove.

The horizontal knife 123 has a V-shaped cutting margin 213 to facilitate the clean cutting of tobacco, which is an important feature of the operation of any cigar machine, FIG. 5. As shown in FIG. 7, the bottom portion 214 of the reservoir block 120 is formed of hardened material and the forward lower portion of the block in front of the opening 130 therein is cut away, as at 215, to reduce the area against which the knife 123 must slide whereby the tendency for tobacco stain or gum to adhere to the knife and be transferred to the reservoir block will be minimized. A spray nozzle 216, FIG. 1, is connected to a supply of water (not shown) and positioned to eject a spray on the knife particularly in the corner of the V or at the conjunction of the sides of the edge 213. The water valve for the nozzle 216 may be opened by any suitable means.

The control means for the horizontal knife 123 is similar to the means for actuating the transfer box 124, FIG. 9. The cam 40 has a cam surface 219 on which is positioned a follower 220 mounted intermediate the ends of a lever 221, the lower end 222 being pivoted on cross frame member 27 and the upper end 223 being pivoted to a rod 224. A toothed rack 225 has one end secured to the rod 224 and the rack 225 is supported on a guide roller 226 in mesh with a spur gear 227 secured to one end of the shaft 206. A similar gear 227' is also secured on the other end of shaft 206 to be turned by it. Upper gears 228 and 228' are keyed to the shaft 209 and are meshed with gears 227 and 227' and with racks 229 which are connected to the rear portion of the knife 123 adjacent to the sides thereof. The racks 229 are kept in engagement with gears 228 and 228' by guide rollers 230. In FIG. 9 the cam 40 is shown in its actuated rest portion *ar* in which knife 123 is under the reservoir opening 130. However, the transfer box 124 is shown in retracted position as at the end of a cycle just prior to the retraction of the knife.

Referring now to FIGS. 3 and 6, the vertical compactor device 104 will now be described in detail. The compactor device 104 comprises a vertical rod 232 slidably mounted in a keyed guide sleeve and having a laterally extending arm 234 adjustably secured adjacent to its upper end. A plate 235 having a shape substantially complementary to the shape of reservoir opening 130 is secured to the arm 234 in vertical alignment with the opening. The lower end 236 of the compactor rod 232 is positioned on a shoe 237 mounted on one end of a lever 238, which has its other end pivoted to a frame member 239. A follower 240 is mounted on the lever 238 intermediate its ends, and is positioned against the outer periphery of an open cam 45, FIG. 6. The cam or switch contact member 107 connected to the compactor or plunger device 104 is just above follower 241 for the upper normally open switch 102 and is adapted to contact successively contact follower 241 to make switch 102 and a follower 242 for normally closed switch 103 when the amount of tobacco in the reservoir opening 130 is low so that the cross feed mechanism 20 will be actuated. The cam 45 has fast acting actuation and retraction portions *a* and *r*, a short actuated rest portion *ar*, and a long retraction rest portion *rr* (just beginning in the position shown in FIG. 6). The compactor 104 is actuated when the slide plate and alignment block 121 and 122 are actuated and before the horizontal knife 123 is actuated so that the vertical stack of tobacco will be pressed to a predetermined density while the horizontal knife is severing a bunch in the transfer box 124. The compactor 104 is then raised to complete its cycle.

The bunch forming mechanism 21 also includes the knock-out device 125 which is adapted to be actuated vertically downwardly through the opening 186 in the transfer box 124 to assure removal of all tobacco for one bunch therefrom. The knock-out device also forms a loop in the apron 187 to receive the bunch. As shown in FIGS. 3–6 and 10, the knock-out device 125 comprises a parallelogram-shaped plate 244 substantially complementary to the opening 186 of the transfer box 124, and a loop forming vertical plate or finger 245 which extends below the plate 244. These plates 244 and 245 are secured to a rigid guide member 246 having vertical bores 247 in which rods 248 extend, the rods being secured at their upper ends to members 249 fixed to the tops of the bearing blocks 148 supporting the shaft 147 for the vertical knife gears 151. A vertical toothed rack 250 is secured to the center of the guide member, and the rack 250 is meshed with a spur gear 251 freely rotatable on the shaft 147. The spur gear 251 is secured to another gear 252 which rides freely on the shaft 147 and this gear is meshed with a gear 253 mounted on a lower shaft 254 journaled between the bearing blocks 148. A small gear 255 is mounted on the end of the shaft 254 and a larger gear 256 freely rotatable on the end of upper shaft 147 is meshed with gear 255, the large gear 256 having one end of a link 257 secured thereto.

The link 257 is pivoted, at 259, to the upper end of a connecting rod 260 (FIGS. 5 and 10), the lower end of which is pivotally connected to one end of a link 261 secured to a stub shaft 262 journaled in bearings 263. The other end of stub shaft 262 has a link 264 secured thereto and the upper end of a rod 265 is pivoted to the link 264 and to one end of a lever 266. The lever 266 has its other end 267 pivoted to the frame 25 and has a cam follower 268 carried on the lever 266 intermediate its ends. The follower 268 is positioned on cam surface 269 of the cam 48.

The knock-out cam 48 has actuation and retraction portions *a* and *r* and a retracted rest portion *rr*, the cam being shown in FIG. 10 about to begin the actuation portion *a*. It is apparent that the knock-out device 125 is reciprocated down and up in operation to perform the function of knocking tobacco from the transfer box 124 and simultaneously forming a loop in apron 187, FIG. 14. During actuation, link 257 turns shaft 258 counterclockwise to rotate the gear 256 and turn gear 255, shaft 254 and gear 253 clockwise so that gears 252 and 251 will turn counter thereto for moving the rack 250 downwardly. The retraction portion of the operation of the knock-out device 125 is the opposite.

*Wrapper forming and transfer mechanism.*—The wrapper forming mechanism 23, FIG. 1, is positioned to the right of the bunch forming mechanism 21 and is adapted to form a wrapper from a tobacco leaf in which the bunch is rolled to form a cigar. The wrapper forming mechanism 23 comprises a rotary table 273 having spaced dies 274 thereon, a cutting roller assembly 275 for cooperation with the dies 274 to form a wrapper, ejector means 276, a pick-up or transfer device 277 for carrying a wrapper from the rotary table 273 to a predetermined position on the apron 187, and suitable vacuum connection means (not shown).

The main frame 25 has a top plate 280 on which the rotary table 273 is mounted for rotation between indexed tobacco leaf supply and wrapper transfer positions of each die 274. Each die 274 is defined by an upper cutting edge 292 from which a plurality of slots 298 radiate and having a vacuum to hold the tobacco leaf scrap. The dies have a central head 299 perforated at 300 through which a vacuum is pulled to hold the wrapper thereon. The dies 274 are diametrically spaced on the rotary table 273 so that one will be moved from ejecting to supply position while the other moves from supply to ejecting position. However, the rotary table 273 will only be actuated 180° in each complete cycle of the remainder of the machine to provide one wrapper for the single bunch that is formed. These supply and ejecting positions are predetermined stations between which the dies move each time the rotary table 273 is actuated. At the former a tobacco leaf is spread over the die 274 and the table then revolves to carry the die under roller assembly 275 to the wrapper transfer position from which the formed or cut wrapper is carried by the pick-up head mechanism 277 to the rolling table apron 187. It is apparent that the supply and transfer positions of the die 274 must be properly indexed to assure proper transfer of the wrapper to the pick-up head mechanism 277. The rotary table 273 is supported subjacently for rotation by diametrically spaced roller assemblies 312, FIG. 10, each of which includes spaced rollers 313 journaled in bearing members 314 adjustably secured to the top plate 280 by means 315.

The pick-up or transfer device 277 for transferring a wrapper from the die 274 of the rotary table 273 to the rolling table apron 187 comprises a vertical sleeve 360 secured to top plate 280 of the frame 25 and a tubular member 362 extends through the sleeve 360 in sealed rotatable condition at the ends of the sleeve. The lower end of the tubular member 362 is sealed and has a sprocket wheel 364 secured thereto forming a portion of the control means for the pick-up device 277. A lower end piece 365 of the tubular member is supported for vertical movement of the tubular member by another portion of the control means therefor. The side wall of the member 362 has an opening in communiaction with the interior of the sleeve 360, which has a duct 367 therefrom leading to the vacuum means for the wrapper forming and transfer mechanism 23.

A right angle bend 368 is fastened to the upper end of the tubular member 362 and a horizontally extending arm or tube 369 is connected to the bend 368 and supports a pick-up head 370 on its other end.

The pick-up head 370 is adapted to be moved from the wrapper transfer position of the rotary table dies 274 in a horizontal path to a wrapper deposit position above the rolling table apron 187 and the pick-up head 370 is then reciprocated downwardly and upwardly to deposit the wrapper in a predetermined position on the apron 187. The pick-up head rotation control means includes the sprocket wheel 364 on the tubular member 362 driven by a sprocket chain 382, which has sufficient play for limited vertical movement of the member 362. The sprocket chain 382 extends around a sprocket wheel 383 journaled on shaft 384 secured to the top plate 280. A link 385 is secured to the sprocket wheel 383 and a connecting rod 386 is pivoted to the link 385 and is actuated by the cam 49. The pick-up head vertical position control means includes a lever 392 actuated by the cam 47. The pick-up head 370 is provided with means for controlling the position of the head relative to the arm 369 to selectively index the head over the apron 187 in either a right-hand R.H. or left-hand L.H. position of the apron.

*Rolling table mechanism.*—The rolling table mechanism 22 is positioned in transverse alignment with the bunch forming mechanism 21 and is longitudinally offset from the wrapper forming mechanism 23 to receive fillers or bunches from the former and wrappers from the latter, and is actuated to roll the wrappers around the filler material to make cigars, suitable adhesive being applied to the wrappers prior to the rolling operation. The rolling table mechanism comprises the flexible apron 187, a forming table 406, a forming roller 407, apron tightening means 408, forming roller control means 409, apron control means 410 and suitable vacuum means (not shown).

As shown in FIGS. 1, 5, 6, 8, 9, 11, 12, 14 and 15, forming table 406 includes a head plate 412 dovetailed, as at 413, with a vacuum housing 414 secured to side plates 415 fastened to the frame members 156 extending across the main frame 25. The vacuum housing 414 has an inlet conduit 417 connected to suitable vacuum means through a valve (not shown), and the forward end of the apron 187 is secured to the housing 414 by a plate 418. The head plate 412 is provided with a depression 419 having a predetermined angularity or concavity in the walls thereof and a plurality of channels 420 are formed in the head plate 412, the bottom of each of which is in communication with the vacuum housing 414 through elongated perforations 421 or the like. The channeled upper working face of the head plate 412 has a vacuum thereon at all times except during a brief portion in the operation of the machine when the wrapper from the rotary table 275 is being deposited thereon. The apron 187 is unattached along the sides, and its rearward margin is secured to the apron tightening means 408. As shown best in FIG. 1, the apron 187 is perforated at 422 to provide passages in communication with the head plate 412, the perforations 422 being in the right and left-hand leaf patterns R.H. and L.H.

The forming roller 407 extends across the forming table 406 and is movable from a fully retracted position (shown in solid lines in FIG. 11) spaced rearwardly of the table to a fully actuated rest position (shown in broken lines in FIG. 11), as will be described hereinafter. The roller 407 has frusto-conical portions 424 and 425 forming a concave central area, the angularity of which is predetermined, and the concavity of the head plate working surface 419 and the roller 407 is substantially complementary to the desired shape of the cigar to be formed by the machine. Each end of the shaft 426 for the roller 407 is carried by a carriage assembly 427, which is pivotally connected by a link 428 to an arm 429 forming a portion of the forming roller control means 409. Each carriage assembly 427 (FIG. 13) comprises a bearing block 430 in which the shaft 426 is journaled, the bearing block 430 having vertical side V-grooves 431 and being supported for vertical movement between a pair of guide blocks 432. The guide blocks 432 are secured to a plate 433 and the bearing block 430 is biased downwardly by a spring 434. The plate 433 has a pair of spaced wheels 435 riding on a track 436 formed in a carriage guide member 437 secured to the side plate 415 of the forming table 406. The track 436 has a lower rearward portion in which the forming roller 407 is in retracted position behind and below the head plate 412, an upper forward portion in which the actuation of the forming roller to roll a cigar takes place, and an angular portion connecting the other portions for moving the forming roller 407 above the head plate 412 to the upper position.

Referring particularly to FIGS. 11 and 12, the control means 409 for the forming roller 407 includes the arms 429, which are secured to a cross shaft 439 journaled in bearings 440 secured to the frame member 156. A spur gear 441 is fastened to the shaft 439 and is meshed with a larger spur gear 442 on a stub shaft 443 carried in bearings 444. A lever arm 445 is also secured to the shaft 443 and the other end of the lever arm has a follower 446 positioned on cam surface 447 of the cam 41. Inasmuch as the actuation of the forming roller control means 409 and the apron control means 410 are cooperable to perform the cigar rolling operation, the description of the forming roller operation will be set out hereinafter.

The apron tightening means 408 is also related to the operation of the rolling table mechanism 22 and will now be described in detail with reference to FIGS. 9, 14 and 15. The rearward margin of the apron 187 extends around and is secured to a cross bar 450 fastened to a cross shaft 451 rotatably mounted in side plates 452 of a swivel mechanism 453 forming a portion of the apron control means 410. One end of the shaft 451 has a sprocket wheel 454 secured thereto and a sprocket chain 455 extends around the wheel 454 and around another sprocket wheel 456 rotatable on a lower frame piece of the main frame 25. A clamp 457 pivotally secures one end of a lever 458 to the chain 455 and the other end of the lever is pivoted to the frame. A follower 459 intermediate the ends of lever 458 is positioned for lever control with the cam 39, which is a combination open and closed cam. It is apparent that upward movement of the lever 458 will carry the chain 455 counterclockwise in FIG. 14 to cause the shaft 451 and bar 450 to rotate in the same direction thereby loosening the apron 187. The precise tightening and loosening of the apron will be described hereinafter.

Referring specifically to FIG. 15, the apron control means 410 includes the swivel mechanism 453, which has the side plates 452 supporting the shaft 451 and a base member 460 mounted on a central vertical pivot 461. A tension spring 462 is connected between one side of the base member 460 and the frame to exert a predetermined force tending to turn the bar 450 to an angular position whereby the tension on one side of the apron will be increased and the other side of the apron will be loosened. The spring 462 is shown connected to the right-hand side of the base member 460 to draw that side rearwardly as shown in FIG. 17c, and the apron control means 410 also includes the cam 44 having a closed cam surface 463 in which is positioned a follower 464 intermediate the ends of a lever 465. One end of lever 465 is pivotally connected by pin 466 to a frame member 467 and the other end of the lever has a cable, chain or the like 468 connected thereto. The cable 468 is wound around and secured to a small drum 469, which is connected to a larger drum 470 and both are mounted on a shaft 471, FIG. 16. The larger drum 470 has one end of a cable 472 fastened to it and the cable 472 is wound around the large drum and secured to the base member 460 on the same side thereof as the spring 462, but through cam 44 exerting a force to overcome the spring tension and position the swivel member 453 as shown in FIGS. 17a, b, d and e to control the apron 187 during a cigar rolling operation.

In the positions of cams 41 and 44 as shown in FIGS. 11 and 15, respectively, the forming roller control means 409 and the apron control means 410 are beginning the retracted rest positions rr of a cycle of operation, the forming roller 407 being retracted to a position behind and below the bunch depositing position of the transfer box 124 with respect to the apron 187 and the toggle bar member 450, 453 extending straight across the rolling table mechanism 22 perpendicular to the path of movement of the forming roller 407 so that the tension on the apron 187 will be substantially even from side to side. During the retracted rest portion rr of cams 41 and 44, the transfer box 124 is moved to the bunch depositing position and the knock-out device 125 is actuated and retracted to deposit a bunch on the apron 187 forwardly of the forming roller 407. At this time, the pick-up head device 277 moves to wrapper depositing position with respect to the perforations 422 of the apron 187 and retracts to the rest position rr over the rotary table 273. Immediately thereafter, but within the retracted rest portion of the cams 41 and 44, the adhesive control mechanism 24 is actuated to deposit an adhesive on the wrapper.

Prior to the retraction portion r of the forming roller 407, the cam follower 459 for cam 39 of the apron tightening means 408 moves into the open portion o so that the weight of the lever 458 causes the chain 455 to rotate the shaft 451 and bar 450 in a clockwise direction thereby tightening the apron 187 to its tightest condition to pull the apron over the roller 407, FIG. 17e, which then rides directly on the head plate 412 of the forming table 406. In the FIG. 14 position of cam 39, the follower 459 is starting on an apron loosening portion 1 of its cycle so that the knock-out device 125 will be able to form a loop in the apron 187 into which the bunch will be deposited from the transfer box 124. The open or outer face of cam 39 is followed by follower 459 to the actuate portion a of the cam where the follower moves into the closed cam portion c for the actual rolling operation. Although the apron 187 appears to be loosened at this portion of the machine operation, the apron becomes doubled on itself to form a closed loop or bight 473 whereby the tension is actually greater during this portion of the machine cycle, FIG. 17b.

Referring again to FIGS. 11, 14 and 15, and to FIGS. 17a–e where the cigar rolling steps are shown diagrammatically, the cam 41 has actuation and rest portions a–1 and ar–1 in which the lever 445 is moved to the left to rotate gear 442 clockwise and gear 441 counter-clockwise to rock arms 429 forwardly to carry roller 407 to the position shown in FIG. 17a. The actuation and rest portions a–2 and ar–2 of the cam 41 moves the forming roller 407 upwardly and forwardly to a position at the rearward edge of the forming table 406 whereby the loop 473 formed in the apron 187 to hold a bunch is closed around the bunch and the apron is tightened as previously described, see FIG. 17b. The rest portion ar–2 provides a time interval for the toggle mechanism 453 to be actuated so that the bar 450 is turned to the position shown in FIG. 17c. When the roller 407 is in its ar–2 rest period, the follower 464 of cam 44 moves into its rsa or right side actuation cycle in which the lever arm 465 is moved upwardly to permit the spring 462 to pull the right side of the toggle mechanism 453 rearwardly whereby the loop 473 of the apron 187 is closed on the right side thereof and is loosened on the left side. The cam 44 then moves into the ar–1 rest portion which maintains the right side of the apron tightened while the cam 41 is moving through the third actuation portion a–3 in which the bunch is rolled into the right half of a right-hand wrapper leaf. During the rest portion ar–3 of the cam 41, the cam 44 actuates toggle mechanism 453 in the lsa portion to reverse the angular position of the bar 450 whereby the left side of the apron loop 473 is closed and the right side is opened, FIG. 17d. The bar 450 is maintained in this position during the rest portion ar–2 of cam 44 during which time the cam 41 moves into actuation portion a–4 to finish rolling the bunch into the left half of the right-hand wrapper leaf. During the rest portion ar–4, the forming roller 407 is held in fully actuated position while cam 44 passes through the retract portion r to straighten out the swivel mechanism 453, and at this time the apron 187 is further tightened by follower 459 moving into the open portion o of cam 39, FIG. 17e.

It is apparent that a left-hand wrapper may be formed about a bunch by connecting the spring 462 and cable 472 to the other sides of the base member 460 or in reverse as shown in phantom lines in FIG. 17e so that the same rolling action, acting in reverse, is provided. It is also apparent that the cigar formed is shaped by the concavity of the head plate 412 and forming roller 407 as well as the manner in which the apron 187 is tightened to form a conical bight 473 substantially complementary to the desired shape of the cigar.

The valving of the vacuum means is timed for the operation of the pick-up head 370 so that a vacuum will be created when the die 274 is indexed at the wrapper transfer station and the wrapper is pressed against the head 370. At this time the vacuum in the ejector means 276 is shut off, the vacuum in the die housing chamber 296 is still on to hold the scrap in place while the wrapper is transferred, the scrap being removed during rotation of the die 274 to the leaf supply station. When the pick-up head 370 is swung to its indexed wrapper depositing position over the apron 187, the vacuum in housing 414 of the rolling table mechanism 22 is shut off for a brief period during which time the pick-up head is lowered to place the wrapper over the perforations 422 of the apron. The vacuum in the pick-up head is shut off and a vacuum is again created in the vacuum housing 414 at this time, and the pick-up head 370 is then again raised and moved to retracted rest position.

*Adhesive depositing mechanism.*—The mechanism 24 is provided to deposit a suitable amount of adhesive in a predetermined pattern on the wrapper leaf prior to the actuation of the rolling table mechanism 22 so that the wrapper will remain rolled about the bunch. Referring to FIGS. 1, 5 and 6, an adhesive mechanism 24 may consist of a suitable sponge or brush carried on a rigid plate 476 mounted on a vertical pivot pin 477 journaled in one end of arm 478. The other end of arm 478 is secured to a vertical shaft 479 rotatably and slidably mounted in a vertical sleeve 480 secured to a frame member 481. The arm 478 is rotated by suitable drive means from the cam 46, FIG. 6, and is lowered from an elevated position into contact with a wrapper on the apron 187, then raised and swung back to its remote position.

When the adhesive brush head is in retracted position it is to the left of the rolling table apron 187 and forwardly thereof. An adhesive receptacle 498 is mounted on the frame and supports a roller 499 against which the brush is adapted to move to pick up a layer of adhesive. The brush 475 is shown in FIG. 1 to be in position to apply adhesive to a right-hand wrapper leaf. However, linkage is provided to adjust the pivotal points of the brush so that during movement to the adhesive depositing position it will turn about pivot pin 477 to assume an indexed position above the apron 187 corresponding to the left-hand wrapper leaf position L.H. The pivot pin 477 has a link 500 rigidly secured thereto and a connecting rod 501 is pivoted to the link 500 and its other end is pivoted to a pin 502 secured in axial alignment with the axis of shaft 479. This arrangement is provided for holding the brush in fixed position for applying an adhesive to right-hand wrappers on the apron 187. However, another mounting member 503 for the pivot pin 502 is spaced from the shaft 479 by a frame piece 504 so that the pin 502 can be moved to this position and the connecting rod 501 may be adjusted so that the brush will move to coincide with the left-hand leaf position.

The details and full operation of the wrapper forming means 23, and the adhesive means 24 are set out in parent application Serial No. 799,137.

OPERATION

In a single revolution of main shaft 34, the cooperable mechanisms of the present machine function to produce a single rolled cigar. A filler is formed by building up a vertical stack of strips of tobacco or the like in the cross feed 20, which is actuated periodically in timed relationship with the operation of the bunch forming mechanism 21 to deliver the filler or bunch tobacco thereto. Variable length actuation of the cross feed mechanism 20 may be effected to produce fillers of different lengths, and cross feed actuation is provided only when the amount of tobacco in the bunch forming mechanism 21 is below a predetermined level.

The filler material delivered to the bunch forming mechanism is severed by the vertical knife 111 which is adjustably positioned at an angular position relative to the direction of cross feed actuation to provide predetermined taper at the ends of a cigar produced. Of course, cylindrical cigars may be produced by the present machine and a knife extending perpendicular to the direction of cross feed would be desired. The filler material is stacked in the vertical reservoir 130 having side walls substantially complementary to the shape of the filler material, the transfer box 124 defining the bottom of the reservoir. The filler tobacco is compressed and severed horizontally by the V-shaped knife 123 to form a bunch for a cigar, and the transfer box 124 is then actuated to a bunch depositing position over the rolling apron 187 of the rolling mechanism 22. Knock-out means 125 is reciprocated through the box 124 to form a loop in apron 187 and to assure complete bunch tobacco discharge into the apron loop forwardly of the cigar forming roller 407. When the box 124 is retracted to its reservoir position and the knife 123 is retracted, the water spray means 216 is actuated to form a mist on the knife whereby high moisture tobacco may be used without building up gum deposits.

The wrapper forming mechanism 23 includes the rotary table 273 having spaced dies 274 alternately operative with successive cycles of the rest of the machine to form a wrapper from either right or left-hand portions of a tobacco leaf. Cutter rollers cooperate with the dies 274 and are pivotally mounted on fixed bases to form the wrapper, and the transfer mechanism 277 is operative in timed relation with the rotary table 273 and the rolling table mechanism 22 to transfer a wrapper from the die 274 to a predetermined position on the rolling apron 187. Either right-hand or left-hand wrapper leaf transfers may be made to angularly related positions on the apron 187 from a single indexed die position of the rotary table.

Similarly, automatic adhesive mechanism 24 is operative in timed relationship with the transfer mechanism 277 and rolling table mechanism 22 to deposit adhesive in a predetermined position on either the apron 187 or the wrapper, or on both the apron and the wrapper.

The rolling table mechanism 22 includes the forming roller 407, which is actuated subsequent to wrapper and adhesive deposit to close the apron loop around the bunch of filler tobacco and carry the bunch in a series of steps across the wrapper to form a single cigar. Mechanism 410 effectively controls the angular position of the forming roller 407 relative to its direction of actuation to form a cigar of predetermined configuration, and it is apparent that a variety of cigar shapes may be formed. Cylindrical cigars require straight line actuation of the roller 407 only. The apron tension is also controlled by means 408 which at the end of forming roller actuation draws the apron to its tautest condition to raise the roller and discharge a cigar from the apron onto suitable mechanism for trimming and cutting the cigar to suitable lengths. In this manner, more than one cigar may be formed by a single operation of the present machine.

Changes and modifications are contemplated, which will be readily apparent to all those skilled in the art, and the scope of the present invention is to be limited only by the claims which follow.

What is claimed is:

1. In a cigar machine, a forming table, a forming apron on said table, a forming roller, means adapted to supply a filler charge to said apron, means adapted to supply a wrapper to said apron, means adapted to impel said roller rectilinearly along said table in a series of intermittent steps to advance the filler charge to predetermined positions relative to the wrapper whereby said filler charge is rolled in said wrapper in a loop of said apron to form a cigar, said apron being free at one end and secured to said table at the other end, apron engaging means engaged with said free end and adapted to apply tensioning force to said apron, and other means engaging said apron engaging means and adapted to apply stretching force alternately to each edge of said apron independently of the tensioning adjustment of said apron.

2. The cigar machine according to claim 1 in which said means to supply a filler charge to said apron includes a movably mounted receptacle adapted to receive a measured filler charge, means adapted to move said receptacle into alignment with said apron loop, a trap door forming the bottom of said receptacle, means adapted to open said trap door, means adapted to expel said filler charge past said trap door into said apron loop, and means adapted to close said trap door after the expulsion of said filler charge.

3. The cigar making machine according to claim 1 which includes, a bunch mechanism having a reservoir in which a vertical stack of tobacco filler material is formed and in which said means to supply a filler charge to said apron includes a transfer box defining the bottom of the reservoir and has a chamber aligned therewith for receiving a filler charge from the vertical stack, means for actuating said transfer box to a filler charge discharging position, a spring-biased plate forming a bottom for the chamber of said transfer box, abutment means contacted by said plate during actuation of said transfer box to move said plate to an open position relative to said chamber when said transfer box is in a centered position over said apron, and pusher means arranged for motion through said chamber for expelling said filler charge into said loop in said apron.

4. The cigar machine according to claim 1 in which said other means includes means to move said apron engaging means to angular positions relative to the direction of movement of said forming roller for providing open and closed sides to the apron loop.

5. The cigar machine according to claim 4 including means to actuate said other means during dwell times in the intermittent actuation of the forming roller to form reverse angular positions of the apron engaging means whereby cigars with tapered ends are formed.

6. The cigar machine according to claim 1 in which said apron engaging means includes a header and means for rotating said header for providing a longitudinal tension on said apron, and said other means comprises a frame journaling the ends of said header, a center pivot for said frame, and means for turning said frame and header about said center pivot to a predetermined angular position for increasing apron tension along one longitudinal edge and reducing apron tension along the other longitudial edge.

7. In a Toscani cigar machine for forming double tapered Toscani cigars, a forming table, a forming apron on said table, a forming roller adapted to traverse said table, means adapted to supply a filler charge on said apron, means adapted to supply a wrapper to said apron, means adapted to impel said roller rectilinearly along said table whereby said filler charge is rolled in said wrapper in a loop of said apron to form a cigar, an apron header, said apron having lateral edges and being secured to said table at one end and to said header at the other end, and mechanisms adapted to actuate said header to provide predetermined apron tension longitudinally of the traverse of said roller and substantially uniformly between said lateral edges, and to rotate said header about a predetermined point to selectively vary the relative tension along the edges of said apron during the rolling of said filler charge in said wrapper.

8. In a cigar machine for making cigars having tapered ends formed of a bunch and a wrapper cut from either a left or right-hand portion of a tobacco leaf, a rotary table having spaced dies movable between leaf receiving and wrapper transfer positions, a rolling table adjacent to said rotary table and including a flexible apron having a bunch receiving position and first and second angularly related wrapper receiving positions, wrapper transfer means for moving a wrapper from the wrapper transfer position of said dies selectively to one of said first and second wrapper receiving positions of said apron, said rolling table including roller means associated with said apron for rolling a bunch in a wrapper in intermittent steps to form a cigar, means connected to said apron for varying the tension on said apron in successive steps of the roller means actuation for producing cigars having tapered ends, and means for reversing the connection of said tension varying means to said apron for rolling cigars with either left-hand or right-hand wrappers.

9. In a cigar machine, a measuring chamber adapted to supply a tapered filler charge, a receptacle slidably mounted with respect to said measuring chamber and adapted to transfer said filler charge therefrom, a forming table, a forming apron on said table, means adapted to supply a wrapper to said apron, a forming roller adapted to traverse said table to operatively form a rolling pocket in said apron, an apron header having a fixed axis of rotation, said apron being secured to said table at one end and to said header at the other end, mechanisms for actuating said header to predeterminately provide apron tension longitudinally of the traverse of said roller and for rotating said header about its fixed axis to selectively vary the relative tension along the edges of the apron, means adapted to move said receptacle and to align it relative to the center of said pocket, whereby a filler charge may be deposited in a centered relationship on said apron and said header may be moved to alternately tension one half of said apron and then the other half of said apron.

References Cited by the Examiner
UNITED STATES PATENTS

| | | | |
|---|---|---|---|
| 315,279 | 4/85 | Haugk | 131—51 |
| 330,604 | 11/85 | McConnell | 131—51 |
| 393,083 | 11/88 | Soler | 131—53 X |
| 500,083 | 6/93 | Smalstig | 131—40 |
| 544,650 | 8/95 | Apsey et al. | 131—52 |
| 635,920 | 10/99 | Dela Mar | 131—42 |
| 1,003,298 | 9/11 | Schmitt | 131—40 |
| 1,124,860 | 1/15 | Chambers | 131—33 |
| 1,147,342 | 7/15 | Rosenthal. | |
| 1,586,330 | 5/26 | Rundell | 131—35 |
| 1,765,841 | 6/30 | Lindblad | 131—53 |
| 2,287,004 | 6/42 | Wheeler | 131—33 |
| 2,337,542 | 12/43 | Carlson | 131—41 |
| 2,470,766 | 5/49 | Durning | 131—21 |
| 2,592,065 | 4/52 | Petri | 131—52 |
| 3,033,210 | 5/62 | Clausen et al. | 131—29 |

SAMUEL KOREN, *Primary Examiner.*